US009582703B2

(12) United States Patent
Shimazawa et al.

(10) Patent No.: US 9,582,703 B2
(45) Date of Patent: Feb. 28, 2017

(54) CODE READING DEVICE AND CODE READING PROGRAM

(71) Applicant: WingArc1st Inc., Tokyo (JP)

(72) Inventors: Ko Shimazawa, Tokyo (JP); Kenta Nakayama, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 14/888,142

(22) PCT Filed: Oct. 10, 2014

(86) PCT No.: PCT/JP2014/077189
§ 371 (c)(1),
(2) Date: Oct. 30, 2015

(87) PCT Pub. No.: WO2015/098241
PCT Pub. Date: Jul. 2, 2015

(65) Prior Publication Data
US 2016/0110580 A1    Apr. 21, 2016

(30) Foreign Application Priority Data

Dec. 25, 2013   (JP) .................................. 2013-266474

(51) Int. Cl.
*G06K 7/14* (2006.01)
*G06K 19/06* (2006.01)

(52) U.S. Cl.
CPC ......... *G06K 7/1491* (2013.01); *G06K 7/1447* (2013.01); *G06K 19/06028* (2013.01)

(58) Field of Classification Search
USPC .................. 235/462.12, 492, 462.41, 462.16
See application file for complete search history.

(56) References Cited

U.S. PATENT DOCUMENTS

| 2005/0103846 | A1* | 5/2005 | Zhu ................. G06K 7/10732 235/462.07 |
| 2005/0224581 | A1 | 10/2005 | Reichenbach et al. |
| 2007/0228174 | A1* | 10/2007 | Vinogradov ............. G06K 7/14 235/462.43 |
| 2008/0245871 | A1* | 10/2008 | Sato .................... G06K 7/10851 235/462.12 |
| 2012/0091204 | A1* | 4/2012 | Shi ....................... G06K 7/1465 235/437 |

(Continued)

FOREIGN PATENT DOCUMENTS

| JP | H07-105304 A | 4/1995 |
| JP | 2001-043300 A | 2/2001 |

(Continued)

*Primary Examiner* — Allyson Trail
(74) *Attorney, Agent, or Firm* — Polsinelli PC

(57) ABSTRACT

A code reading device is equipped with a region extracting unit 2, which divides a photographed image of a bar code into a plurality of horizontal areas, and extracts readable regions from the horizontal areas respectively, and a region coupling unit 4, which couples the extracted regions to restore the whole bar code. Even if an unreadable portion occurs in a part of the bar code, a plurality of readable regions are extracted as parts of the barcode and those regions are coupled to restore a bar code the entirety of which can be read. Consequently, it is possible to accurately read a bar code having dirt or containment of illumination light partially.

8 Claims, 5 Drawing Sheets

(56) References Cited

U.S. PATENT DOCUMENTS

2013/0256417 A1* 10/2013 Lee ..................... G06K 7/1413
                                                    235/462.16
2014/0084061 A1*  3/2014 Kimura ............... G06K 7/1413
                                                    235/437

FOREIGN PATENT DOCUMENTS

| JP | 2001-167226 A | 6/2001 |
| JP | 2003-036416 A | 2/2003 |
| JP | 2004-054581 A | 2/2004 |
| JP | 2009-099099 A | 5/2009 |

* cited by examiner

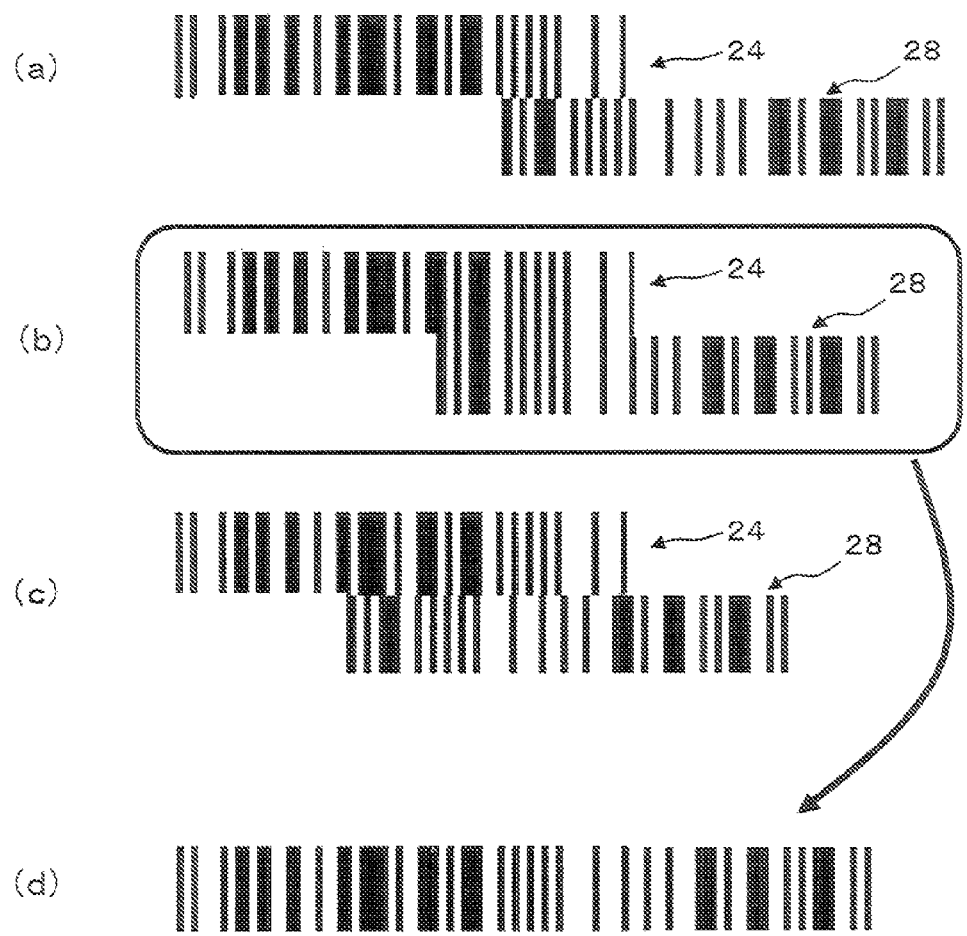

CODE READING DEVICE AND CODE READING PROGRAM

CROSS REFERENCE TO RELATED APPLICATIONS

This application is a National Phase filing under 35 U.S.C. § 371 of PCT/JP2014/077189 filed on Oct. 10, 2014; and this application claims priority to Application No. 2013-266474 filed in Japan on Dec. 25, 2013. The entire contents of each application are hereby incorporated by reference.

TECHNICAL FIELD

The present invention relates to a code reading device and a code reading program, and more particularly, is suitably used in a code reading device for reading a bar code from a photographed image.

BACKGROUND ART

Conventionally, a bar code representing various information by a striped pattern formed in a predefined combination of white lines and black lines with various thicknesses and a two-dimensional code capable of representing much information with a plurality of dots arranged vertically and horizontally are utilized in wide fields because reading and code recognition can easily be carried out.

For example, these barcodes and two-dimensional codes (which will be hereinafter referred to as codes collectively) are attached to packages of products and the like and are used for recognizing the products in a distribution process. In this case, the codes are read by means of a special code reader, camera or the like and are decoded into information configured from numerical values or letters. Recently, there is also provided the technology for displaying a code on a screen of a mobile terminal such as a portable telephone or a smartphone and reading the displayed code by a special code reader and decoding the displayed code.

In the case in which the code attached to the package of the product or the like is read by the camera, however, there is a problem in that the code cannot be read accurately if dirt sticks to the code itself or illumination light is contained in an image photographed by a camera in overlap with a code.

In the case in which a code displayed on a display screen of a mobile terminal is read, moreover, there is a problem in that the code cannot be read accurately if a scratch or dirt sticks to a display screen or the display screen partially causes mirror reflection by an incident angle of illumination light sent from a code reader.

In consideration of the latter problem, there is proposed the technology capable of accurately decoding a QR code (the registered trademark and so forth) displayed on a screen even if mirror reflection is caused on a screen of a mobile terminal or a scratch, dirt or the like sticks to the screen (for example, see Patent Document 1). In the technology described in the Patent Document 1, an image of the same QR code is displayed plural times on the screen at a time interval and the image to be displayed plural times is set to be displayed in a state in which it is rotated by 90 degrees at each time. Even if an unreadable portion occurs in a part of the QR code, thus, the portion which cannot be read in first display of the QR code can be read in second or succeeding display.

Moreover, the patent document 1 also describes that one QR code is divided into a plurality of parts and images of respective codes obtained by the division are displayed on the screen in order at a time interval. In this case, the respective codes thus divided are read by a code reader and are thus decoded and the data decoded from the respective codes are synthesized to obtain decode data on an original QR code.

Patent Document 1: Japanese Laid-Open Patent Publication No. 2004-54581

DISCLOSURE OF THE INVENTION

In the technology described in the patent document 1, it is possible to solve a problem in the case in which a part of codes displayed on the screen of the mobile terminal cannot be read due to the dirt of the screen, the mirror reflection or the like. However, it is impossible to solve a problem in the case in which the code itself contained in the image photographed by the camera cannot be read due to the dirt of the code itself attached to the package of the product or the like or the containment of the illumination light into the photographed image or the like.

The present invention has been made in order to solve the problems and has an object to enable a code to be accurately read even if dirt sticks to the code itself attached to a package of a product or the like or illumination light is contained in a photographed image in overlap with the code.

In order to solve the problem, in the present invention, a photographed image of a bar code is divided into a plurality of horizontal areas and readable regions are extracted from the horizontal areas respectively, and the extracted regions are coupled to restore the whole bar code.

According to the present invention having the structure described above, even if dirt sticks to a code itself attached to a package of a product or the like or illumination light is contained in a photographed image in overlap with a code and thereby an unreadable portion occurs in a part of the bar code, a plurality of readable regions are extracted as parts of the bar code and those regions are coupled to restore a bar code which can be read as a whole. Consequently, it is possible to accurately read a bar code having dirt or containment of illumination light partially.

BRIEF DESCRIPTION OF THE DRAWINGS

FIG. 5 is a diagram for explaining an operation of a region coupling unit according to the present embodiment.

BEST MODE FOR CARRYING OUT THE INVENTION

Figure 1:
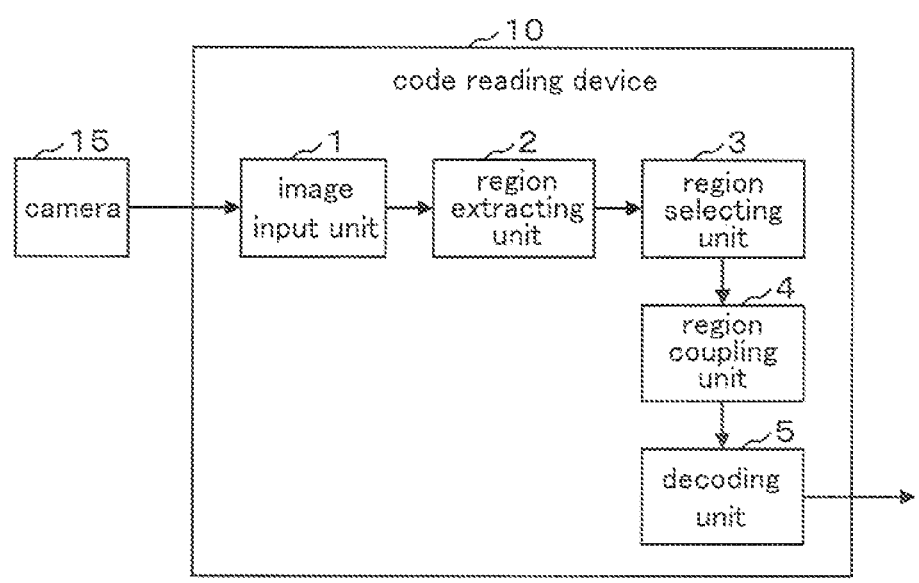
FIG. 1 is a block diagram showing an example of a functional structure of a code reading device according to the present embodiment.

An embodiment of the present invention will be described below with reference to the drawings. FIG. 1 is a block diagram showing an example of a functional structure of a code dreading device according to the present embodiment. A code reading device 10 according to the present embodiment is mounted on a mobile terminal such as a smartphone or a tablet, for example, and includes, as a functional structure thereof, an image input unit 1, a region extracting unit 2, a region selecting unit 3, a region coupling unit 4 and a decoding unit 5.

The respective functional blocks 1 to 5 can also be configured from all of hardware, a DSP (Digital Signal Processor) and software. For example, in the case in which the respective functional blocks 1 to 5 are configured from the software, they actually include a CPU, an RAM, an ROM and the like in a computer and is implemented by an operation of a code reading program stored in a recording medium such as the RAM, the ROM, a hard disk or a semiconductor memory.

The image input unit 1 inputs an image of a bar code which is photographed by a camera 15 provided in the mobile terminal. For example, when a user photographs a bar code attached to a package of a product by the camera 15, the image input unit 1 inputs the photographed image from the camera 15 to the code reading device 10.

Figure 2:
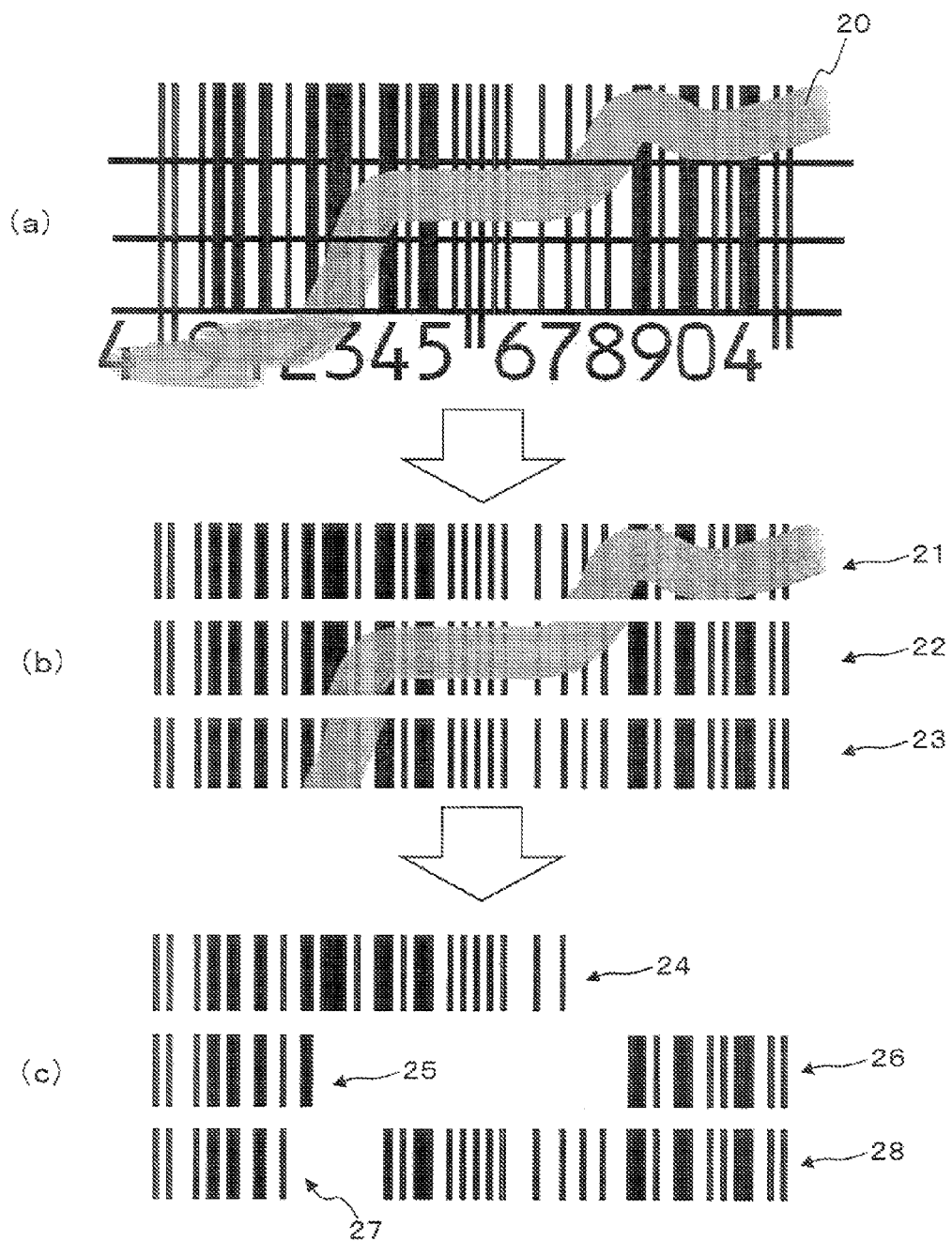
FIG. 2 is a diagram for explaining an operation of a region extracting unit according to the present embodiment.

The region extracting unit 2 divides the photographed image of the bar code input through the image input unit 1 into a plurality of horizontal areas and extracts readable regions from the respective horizontal areas. FIG. 2 is a diagram for explaining an operation of the region extracting unit 2. FIG. 2(*a*) shows a photographed image of a bar code attached to a package of a product and illustrates a state in which dirt 20 sticks onto a bar code.

FIG. 2(*b*) shows a state in which the photographed image of the bar code having the dirt 20 stuck thereto is divided into three equal parts, that is, three horizontal areas 21, 22 and 23, and FIG. 2(*c*) shows a state in which readable regions 24 to 28 are extracted from the horizontal areas 21, 22 and 23 respectively. The readable regions 24 to 28 are regions in which the dirt 20 does not stick at all in whole lengths of a black line and a white line, for example. When the dirt 20 sticks to the bar code, the dirt 20 portion has neither of black and white colors but an intermediate color. Therefore, the region extracting unit 2 extracts, as the readable regions 24 to 28, areas having no intermediate color in the whole lengths of the black and white lines.

Moreover, a maximum width which can be taken as the white line is usually defined in a bar code. Therefore, the region extracting unit 2 decides whether an area width of a white color exceeds the maximum width of the white line, and divides the region if the area width exceeds the maximum width. In other words, a region in the middle horizontal area 22 is divided to extract two readable regions 25 and 26, and a region is also divided in the lowest horizontal area 23 to extract two readable regions 27 and 28.

Figure 3:
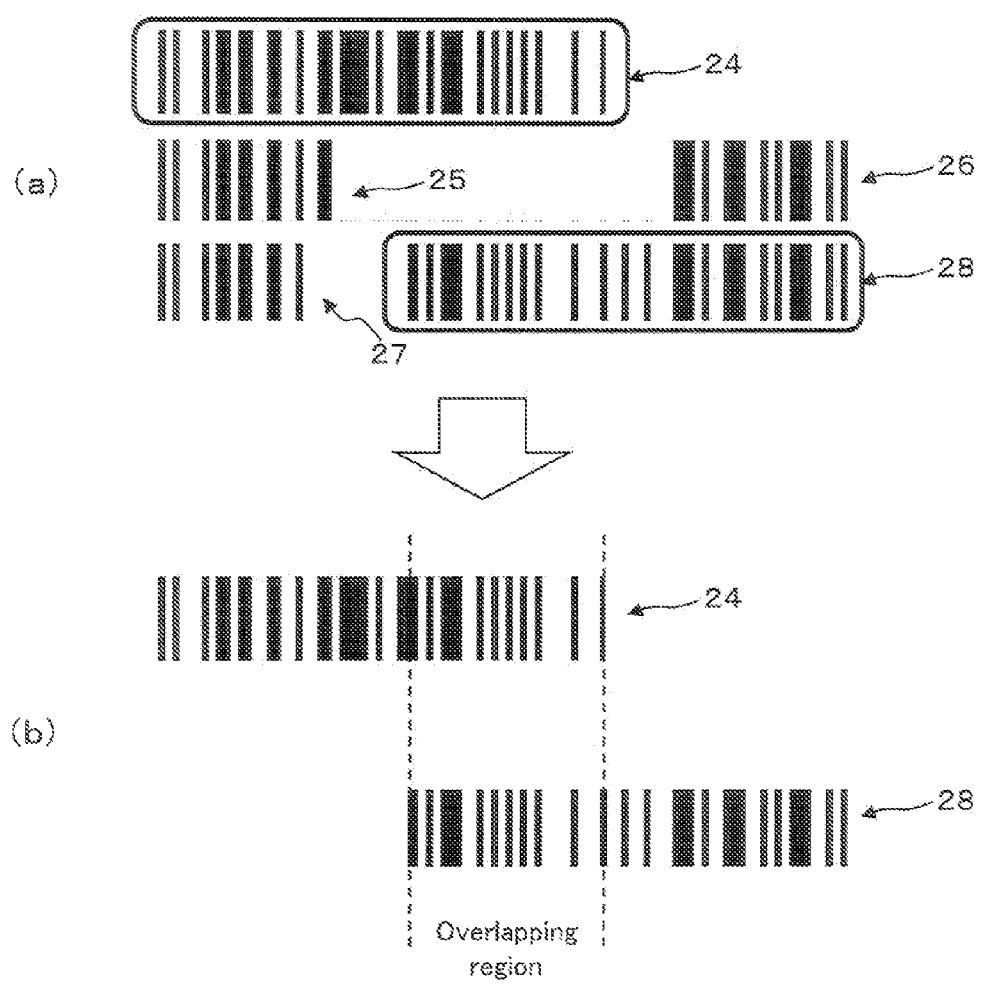
FIG. 3 is a diagram for explaining an operation of a region selecting unit according to the present embodiment.

The region selecting unit 3 selects any of the readable regions 24 to 28 extracted by the region extracting unit 2, and the selected regions are suitable for coupling through the region coupling unit 4. FIG. 3 is a diagram for explaining an operation of the region selecting unit 3. The suitable regions for the coupling indicate minimum regions capable of restoring a whole original bar code when the coupling is carried out by the region coupling unit 4.

Specifically, the region selecting unit 3 selects at least the first region 24 including a left end of the bar code and the second region 28 including a right end of the bar code. In the case in which a plurality of regions including the left end are present, one of them which has the greatest width is selected. In other words, the region 24 having the greatest width is selected from the three readable regions 24, 25 and 27 including the left end. In the case in which a plurality of regions including the right end are present, similarly, one of them which has the greatest width is selected. In other words, the region 28 having the greatest width is selected from the two readable regions 26 and 28 including the right end.

The region selecting unit 3 decides whether an overlapping region is present in the first region 24 and the second region 28 which are extracted as described above. In the case in which the overlapping region is present, the region selecting unit 3 does not select any other region. The case of FIG. 3 is relevant thereto. For this reason, the region to be selected by the region selecting unit 3 includes only the first region 24 and the second region 28.

Figure 4:
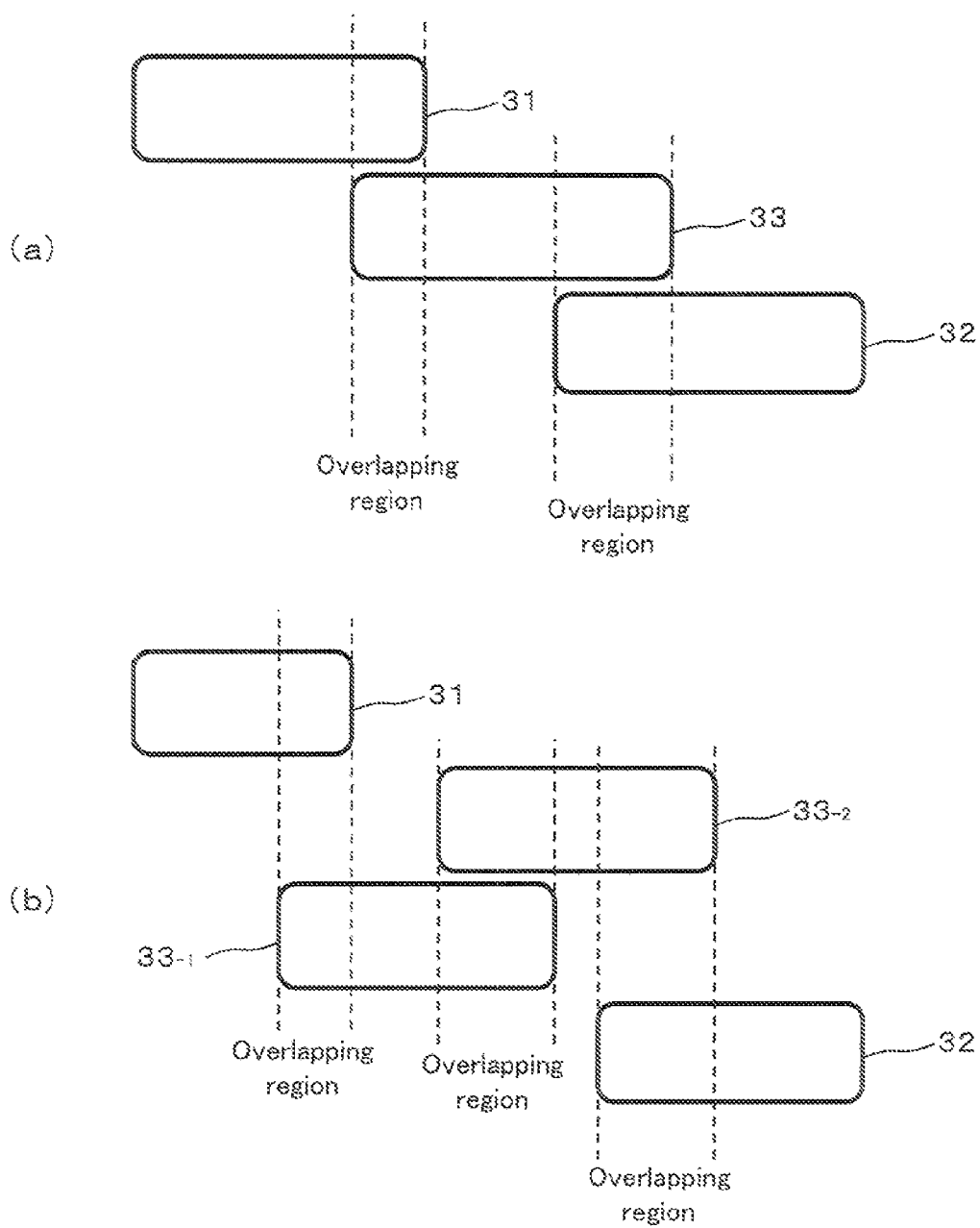
FIG. 4 is a diagram for explaining the operation of the region selecting unit according to the present embodiment.

On the other hand, in the case in which the overlapping region is not present in the first region 31 including the left end of the bar code and the second region 32 including the right end as shown in FIG. 4, the region selecting unit 3 further selects one or more third regions 33 placed in an intermediate position connecting the first region 31 and the second region 32. It is preferable that the third region 33 to be selected at this time should have an overlapping region together with the first region 31 and an overlapping region together with the second region 32 as shown in FIG. 4(*a*). The reason is that one third region 33 is to be selected at a minimum.

In the case in which the region overlapping with both the first region 31 and the second region 32 is not present, however, a third region $33_{-1}$ having an overlapping region together with at least the first region 31 and a third region $33_{-2}$ having an overlapping region together with at least the second region 32 are selected as shown in FIG. 4(*b*). In order to enable the third regions 33 to be selected, thus, it is necessary to set the number of division of the horizontal areas into four or more.

It is preferable that the two third regions $33_{-1}$ and $33_{-2}$ to be selected as shown in FIG. 4(*b*) should mutually have an overlapping region since two regions, that is, the third regions $33_{-1}$ and $33_{-2}$ to be selected are enough. In the case in which the overlapping region is not present between the two third regions $33_{-1}$ and $33_{-2}$, the region selecting unit 3 further selects another third region placed in an intermediate position connecting them.

The region coupling unit 4 couples the regions selected by the region selecting unit 3 to restore the whole bar code. Specifically, the region coupling unit 4 gradually couples line segments in the regions while shifting positions of the regions and employs a coupling state of a position in which a matching degree of the line segments in the regions is the highest.

FIG. 5 is a diagram for explaining an operation of the region coupling unit 4. FIGS. 5(*a*) to 5(*c*) typically show three states when a positional relationship between the first region 24 and the second region 28 selected by the region selecting unit 3 is shifted every dot in a horizontal direction. FIG. 5(*b*) shows a state in which a matching degree of the black lines in the first region 24 and the black lines in the second region 28 is the highest.

In this case, the region coupling unit 4 employs a coupling state in a positional relationship of FIG. 5(*b*) and couples the black lines in the first region 24 and the black lines in the second region 28. Specifically, the image of the first region 24 and that of the second region 28 are synthesized in such a manner that the matched line segments (line segments in the overlapping regions) are overlapped into one. FIG. 5(*d*) shows the result.

In the case in which three or more regions are selected as shown in FIG. 4, the processing described above is carried out between two regions mutually having the overlapping regions to restore the whole bar code. For example, in the case in which the three regions 31 to 33 are selected as shown in FIG. 4(a), the line segments are coupled between the first region 31 and the third region 33, and furthermore, the line segments are coupled between the second region 32 and the third region 33.

The decoding unit 5 decodes the bar code restored by the region coupling unit 4 and outputs information such as a numerical string, a character string or the like thus obtained. As shown in FIG. 5(d), the bar code restored by the region coupling unit 4 has a length (lengths of the black and white lines) in a vertical direction which is smaller than that of an original bar code. However, a striped pattern in a horizontal direction is perfectly restored. The bar code is read based on the striped pattern in the horizontal direction. Even if the length in the vertical direction is small as shown in FIG. 5(d), therefore, it is possible to accurately perform decoding.

As described above in detail, in the present embodiment, the photographed image of the bar code is divided into the horizontal areas 21 to 23 and the readable regions 24 to 28 are extracted from the horizontal areas 21 to 23 respectively, and furthermore, the regions 24 and 28 which are suitable for coupling are selected. The selected regions 22 and 28 are coupled to restore the whole bar code.

According to the present embodiment having such a structure, even if the dirt 20 sticks to the bar code itself attached to the package of the product or the like as shown in FIG. 2(a) and an unreadable portion occurs in a part of the bar code, it is possible to generate an image of a bar code which can be read wholly as shown in FIG. 5(d). Consequently, it is also possible to accurately read the bar code having the dirt 20 partially. Even if illumination light is contained in the photographed image in overlap with the bar code, similarly, it is possible to carry out accurate reading.

Although the description has been given to the example in which the regions 24 and 28 that are suitable for the coupling are selected from the readable regions 24 to 28 and the selected regions 24 to 28 are coupled to each other in the embodiment, the present invention is not restricted thereto. For example, it is also possible to restore the whole bar code by coupling the regions 24 to 28 extracted by the region extracting unit 2. However, the selection of the regions to be coupled is preferable in that a processing load in the coupling can be decreased.

Although the description has been given to the example in which the bar code is divided into the three equal parts, that is, the three horizontal areas 21 to 23 in the embodiment, moreover, the number of division is only illustrative. If the number of division is increased, the region which is suitable for the coupling through the region coupling unit 4 is easily longer. For this reason, it is also possible to divide the bar code into four or more horizontal areas.

It is also possible to carry out the processing as follows. That is, the bar code is first divided into two horizontal areas. And, in the case in which the number of the regions to be selected from the respective horizontal areas by the region selecting unit 3 is more than two, the number of division is increased to be three. And also, in the case in which the number of the regions to be selected from the three horizontal areas by the region selecting unit 3 is more than two, the number of division is further increased to be four. Thus, the number of division of the horizontal area may be increased until the number of the regions to be selected by the region selecting unit 3 is equal to or smaller than two.

Consequently, it is sufficient to always couple two regions or less in the region coupling unit 4 (the coupling itself is unnecessary if only one region is to be selected by the region selecting unit 3). Therefore, it is possible to decrease the processing load in the coupling. A criterion for an increase in the number of division of the horizontal area may be set as to whether the number of the regions to be selected by the region selecting unit 3 is equal to or smaller than three.

It is also possible to carry out the processing as follows. That is, the bar code is first divided into two horizontal areas. And, in the case in which the left end or right end of the bar code is not included in any of the readable regions extracted from the respective horizontal areas by the region extracting unit 2, the number of division is increased to be three. And also, in the case in which the region including the left end of the bar code or the region including the right end is not extracted by the region extracting unit 2 even if the number of division of the horizontal area is increased to be three, the number of division is further increased to be four. Thus, the number of division of the horizontal area may be increased until both the region including the left end of the bar code and the region including the right end are extracted by the region extracting unit 2.

Although the description has been given to the example in which the region extracting unit 2 extracts, as the readable regions 24 to 28, the areas including no intermediate color in the whole lengths of the black line and the white line in the embodiment, moreover, the present invention is not restricted thereto. For example, even if the dirt 20 sticks to a part of the whole length, it is also possible to extract the readable regions including the areas set into a state in which at least a part of the black line has no dirt 20. In this case, however, the readable regions are extracted and the processing of removing the dirt 20 is then carried out.

The processing of removing the dirt 20 can be performed in the following manner, for example. In other words, the region having the intermediate color is scanned in the vertical direction (the length direction of the black line or the white line) every dot in the horizontal direction to decide which one of the dots of the black and white colors is included in a string. Thus, it is decided, every string, which has the dirt 20 stuck thereto, the black line or the white line. Referring to the string in which the dirt 20 sticks to the black line, the intermediate color of the dirt 20 is replaced with the black color. On the other hand, referring to a string in which the dirt 20 sticks to the white line, the intermediate color of the dirt 20 is replaced with the white color.

Thus, there is a higher possibility that the length in the horizontal direction of the readable region extracted by the region extracting unit 2 can be more increased and the number of the regions to be selected by the region selecting unit 3 can be decreased as greatly as possible. Consequently, it is possible to decrease a processing load in the coupling of the line segments through the region coupling unit 4. When extracting the readable region, moreover, the region extracting unit 2 can also extract the region including the left end or the right end of the bar code easily.

In addition, the embodiment is only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 1 image input unit
2 region extracting unit
3 region selecting unit
4 region coupling unit
5 decoding unit
10 code reading device

The invention claimed is:

1. A code reading device comprising:
   a region extracting unit for dividing a photographed image of a bar code into a plurality of horizontal areas and extracting readable regions from the horizontal areas respectively by setting, as a break, a portion in which an area width of a white color exceeds a maximum width of a white line;
   a region coupling unit for coupling the regions extracted by the region extracting unit to restore the whole bar code; and
   a decoding unit for decoding the bar code restored by the region coupling unit.

2. The code reading device according to claim 1 further comprising:
   a region selecting unit for selecting any of the regions extracted by the region extracting unit, the selected regions being suitable for the coupling through the region coupling unit,
   wherein the region coupling unit couples the regions selected by the region selecting unit to store the whole bar code.

3. The code reading device according to claim 2,
   wherein the region selecting unit selects at least a first region including a left end of the bar code and a second region including a right end of the bar code and further selects one or more third regions placed in an intermediate position connecting the first region and the second region when an overlapping region is not present in the first region and the second region.

4. The code reading device according to claim 2,
   wherein the region coupling unit gradually couples line segments in the regions while shifting positions of the regions and employs a coupling state of a position in which a matching degree of the line segments in the regions is the highest.

5. The code reading device according to claim 3,
   wherein the region coupling unit gradually couples line segments in the regions while shifting positions of the regions and employs a coupling state of a position in which a matching degree of the line segments in the regions is the highest.

6. The code reading device according to claim 1,
   wherein the region coupling unit gradually couples line segments in the regions while shifting positions of the regions and employs a coupling state of a position in which a matching degree of the line segments in the regions is the highest.

7. A code reading program for causing a computer to function as:
   region extracting means for dividing a photographed image of a bar code into a plurality of horizontal areas and extracting readable regions from the horizontal areas respectively by setting, as a break, a portion in which an area width of a white color exceeds a maximum width of a white line;
   region coupling means for coupling the regions extracted by the region extracting means to restore the whole bar code; and
   decoding means for decoding the bar code restored by the region coupling means.

8. The code reading program according to claim 7 further comprising:
   region selecting means for selecting any of the regions extracted by the region extracting means which is suitable for the coupling through the region coupling means,
   wherein the region coupling means couples the regions selected by the region selecting means to restore the whole bar code.

* * * * *